US012627701B2

(12) United States Patent
Singh et al.

(10) Patent No.: US 12,627,701 B2
(45) Date of Patent: May 12, 2026

(54) SYSTEM AND METHOD FOR DETERMINING NETWORK PATHWAY SECURITY VULNERABILITIES

(71) Applicant: Bank of America Corporation, Charlotte, NC (US)

(72) Inventors: Shailendra Singh, Thane West (IN); Saurabh Gupta, New Delhi (IN); Usha Rani Alluru, Hyderabad (IN); Amit Bhandari, Dehradun (IN)

(73) Assignee: Bank of America Corporation, Charlotte, NC (US)

( * ) Notice: Subject to any disclaimer, the term of this patent is extended or adjusted under 35 U.S.C. 154(b) by 113 days.

(21) Appl. No.: 18/624,317

(22) Filed: Apr. 2, 2024

(65) Prior Publication Data
US 2025/0310368 A1 Oct. 2, 2025

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC . H04L 63/1433; H04L 63/1425; H04L 63/20; H04L 63/1408; H04L 41/147
See application file for complete search history.

(56) References Cited

U.S. PATENT DOCUMENTS

| 6,307,926 B1 | 10/2001 | Barton et al. |
| 2012/0209762 A1 | 8/2012 | Metaireau et al. |

| 2016/0380878 A1 | 12/2016 | Bugenhagen et al. |
| 2017/0324664 A1 | 11/2017 | Xu et al. |
| 2017/0339057 A1 | 11/2017 | Sella |
| 2017/0346722 A1 | 11/2017 | Smith et al. |
| 2018/0091394 A1 | 3/2018 | Richards et al. |
| 2018/0287937 A1 | 10/2018 | Jalan et al. |
| 2019/0187690 A1 | 6/2019 | Cella et al. |

(Continued)

OTHER PUBLICATIONS

Vikram et al., "Anomaly detection in Network Traffic Using Unsupervised Machine learning Approach, " 2020 5th International Conference on Communication and Electronics Systems (ICCES) Year: 2020 | Conference Paper | Publisher: IEEE.*

(Continued)

*Primary Examiner* — Roderick Tolentino

(57) ABSTRACT

A system for real-time monitoring of network pathways includes a memory for storing network node information and a processor configured to periodically receive information for each node associated with a plurality of network pathways. The information may include response time, geographic location, failure rate, and latency. The processor calculates a score that indicates each node's reliability. Each of the plurality of attributes is given a different weight during the calculation. The processor then calculates an aggregated network pathway score for each of the plurality of network pathways to indicate a particular pathway's reliability. The aggregated network pathway score is calculated based at least in part upon the score of each node associated with each of the plurality of network pathways. Once the aggregated network pathway score is calculated, a first network pathway is identified based at least in part upon the aggregated network pathway score.

17 Claims, 2 Drawing Sheets

(56) References Cited

U.S. PATENT DOCUMENTS

| | | | |
|---|---|---|---|
| 2019/0238634 A1* | 8/2019 | Mohanta | H04L 45/46 |
| 2019/0386918 A1 | 12/2019 | Iyer et al. | |
| 2020/0134175 A1* | 4/2020 | Marwah | G06F 9/542 |
| 2020/0314122 A1* | 10/2020 | Jones | G06N 3/0895 |
| 2020/0364366 A1* | 11/2020 | Kundu | G06N 3/04 |
| 2021/0119890 A1 | 4/2021 | Richards et al. | |
| 2021/0258239 A1 | 8/2021 | Richards et al. | |
| 2022/0217179 A1* | 7/2022 | Fieau | H04L 45/20 |
| 2022/0255848 A1 | 8/2022 | Bajaj | |
| 2022/0329479 A1 | 10/2022 | Ramachandran et al. | |
| 2023/0019788 A1 | 1/2023 | Bajaj | |
| 2023/0029380 A1* | 1/2023 | Hyatt | G06F 9/5072 |
| 2024/0031380 A1* | 1/2024 | Lal | H04L 63/1458 |
| 2024/0256323 A1* | 8/2024 | Sharma | G06F 9/45558 |
| 2024/0380769 A1* | 11/2024 | Verhappen | H04L 63/1425 |
| 2025/0252440 A1* | 8/2025 | Singh | G06Q 20/4014 |

OTHER PUBLICATIONS

Hou et al., "Detection and Characterization of Network Anomalies in Large-Scale RTT Time Series," IEEE Transactions on Network and Service Management Year: 2021 | vol. 18, Issue: 1 | Journal Article | Publisher: IEEE.*

* cited by examiner

Method 200

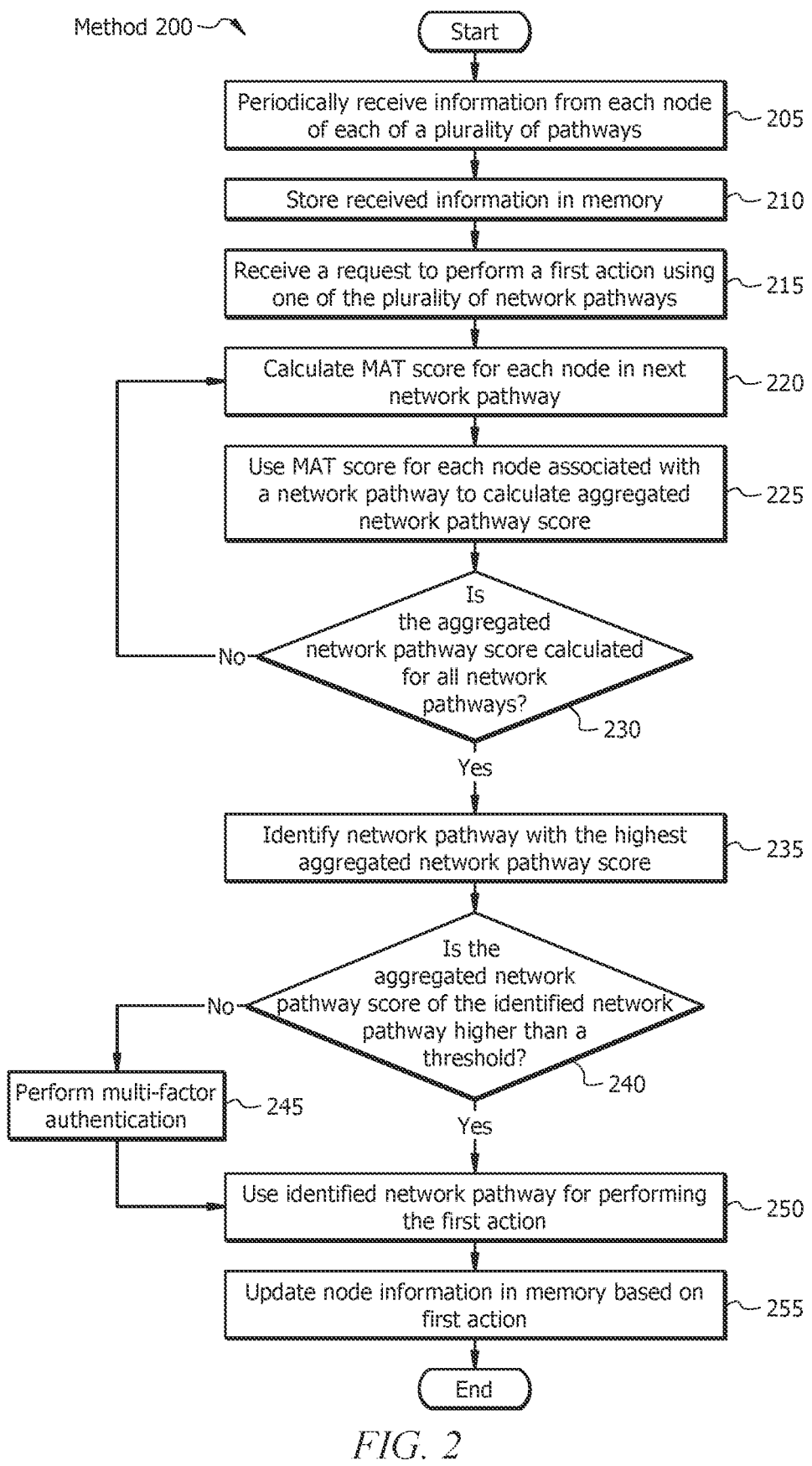

Start

Periodically receive information from each node of each of a plurality of pathways ~ 205

Store received information in memory ~ 210

Receive a request to perform a first action using one of the plurality of network pathways ~ 215

Calculate MAT score for each node in next network pathway ~ 220

Use MAT score for each node associated with a network pathway to calculate aggregated network pathway score ~ 225

Is the aggregated network pathway score calculated for all network pathways? ~ 230

No

Yes

Identify network pathway with the highest aggregated network pathway score ~ 235

Is the aggregated network pathway score of the identified network pathway higher than a threshold? ~ 240

No

Perform multi-factor authentication ~ 245

Yes

Use identified network pathway for performing the first action ~ 250

Update node information in memory based on first action ~ 255

End

*FIG. 2*

SYSTEM AND METHOD FOR DETERMINING NETWORK PATHWAY SECURITY VULNERABILITIES

TECHNICAL FIELD

The present disclosure relates generally to network communications and, more specifically, to a system and method for determining network pathway security vulnerabilities.

BACKGROUND

For many activities, there is a need to communicate data reliably and securely over large networks, including the Internet. However, since many of these networks include multiple nodes and paths, bad actors often have numerous opportunities to intercept and interfere with the data. This may result in the activities being unable to be performed, sensitive information being passed to the bad actors, and/or other fraudulent data uses.

SUMMARY

The system and method disclosed in the present application provide a technical solution to the technical problems discussed above by providing the capability to monitor network pathways in real-time and identify a pathway that has reduced security vulnerabilities. Monitoring is performed by periodically receiving information about various attributes for each node associated with a network pathway. The attributes are each given a separate weight, and a score may be calculated for each node, which reflects the ability and/or probability that the node may reliably transmit the data and/or the probability that the node is compromised. The score for each node is then used to calculate an aggregated pathway score for each pathway that uses the node. The aggregated pathway score may be determined by calculating an average score for all the nodes associated with a given pathway. The pathways with the highest score, indicating that the pathway has high reliability and/or low probability of being compromised, may be used when performing an action.

The attributes may include information related to a node's response time, geographic location, failure rate, and latency. Other attributes may include if fraud has been previously detected on a node and considerations of the node's current software and security settings. Other attributes of the node and the pathway as a whole may be considered for calculating the score for a given node and the network depending on an organization's preference and needs, attacks previously detected for a given action or type of data, and as the nature of the network, data, actions, and attacks evolve.

Similarly, the weight given to any given attribute or node in calculating a node's score and the aggregate pathway score may be determined based on an organization's preference and needs, previously detected attacks, and changes needed as the nature of the network, data, actions, and attacks evolve. Alternatively, the weight given may be determined by a neural network such as a convolutional neural network that is continuously updated using the real-time monitoring of the various nodes and network paths.

In one embodiment, the disclosed system performs real-time monitoring of network pathways. The system includes a memory for storing network node information and a processor operably coupled to the memory. The processor is configured to receive information periodically from each node of a plurality of network pathways. The information comprises a plurality of attributes of each node, including at least response time, geographic location, failure rate, and latency. The received information is then stored in the memory.

The processor then receives a request from an external device to perform a first action using one of the plurality of network pathways. The processor calculates a score for each node of the plurality of network pathways, indicating each node's reliability using the received information stored in the memory. During the calculation, each of the plurality of attributes is given a different weight based at least in part upon predetermined criteria. The processor then calculates an aggregated network pathway score for each of the plurality of network pathways, indicating the reliability of each network pathway. The aggregated network pathway score is based, at least in part, upon the score of each node associated with each of the plurality of network pathways. Based on at least the aggregated network pathway score for each of the plurality of network pathways, the processor then identifies the first network pathway. The first action is then performed using the identified first network pathway.

The disclosed system provides several practical applications, such as providing an efficient manner for choosing from a plurality of network pathways the best network pathway to use. Scoring each node in real-time based on several predetermined criteria allows for identifying problematic nodes and/or pathways in real-time. This will enable actions to be taken automatically and quickly to avoid problematic or corrupted nodes and/or pathways. The data may be transmitted in a reliable and secure manner by re-routing it using currently safe and reliable pathways and/or taking preventative actions such as requiring multi-factor authentication when using vulnerable nodes. These actions may be taken before a user or operator is even aware that a problem or attack has occurred. Further, by monitoring individual nodes and pathways, repairs or countermeasures may be quickly made when a problem is encountered with one or more nodes. This results in a robust network with fewer failures and bottlenecks. Data may easily be routed around any failed or compromised node, reducing failure rates and improving the user experience compared to the existing approaches. This will give users better performance and ensure the security of the data they transmit over the network.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates one embodiment of a flowchart for identifying a network pathway.

DETAILED DESCRIPTION

Figure 1:
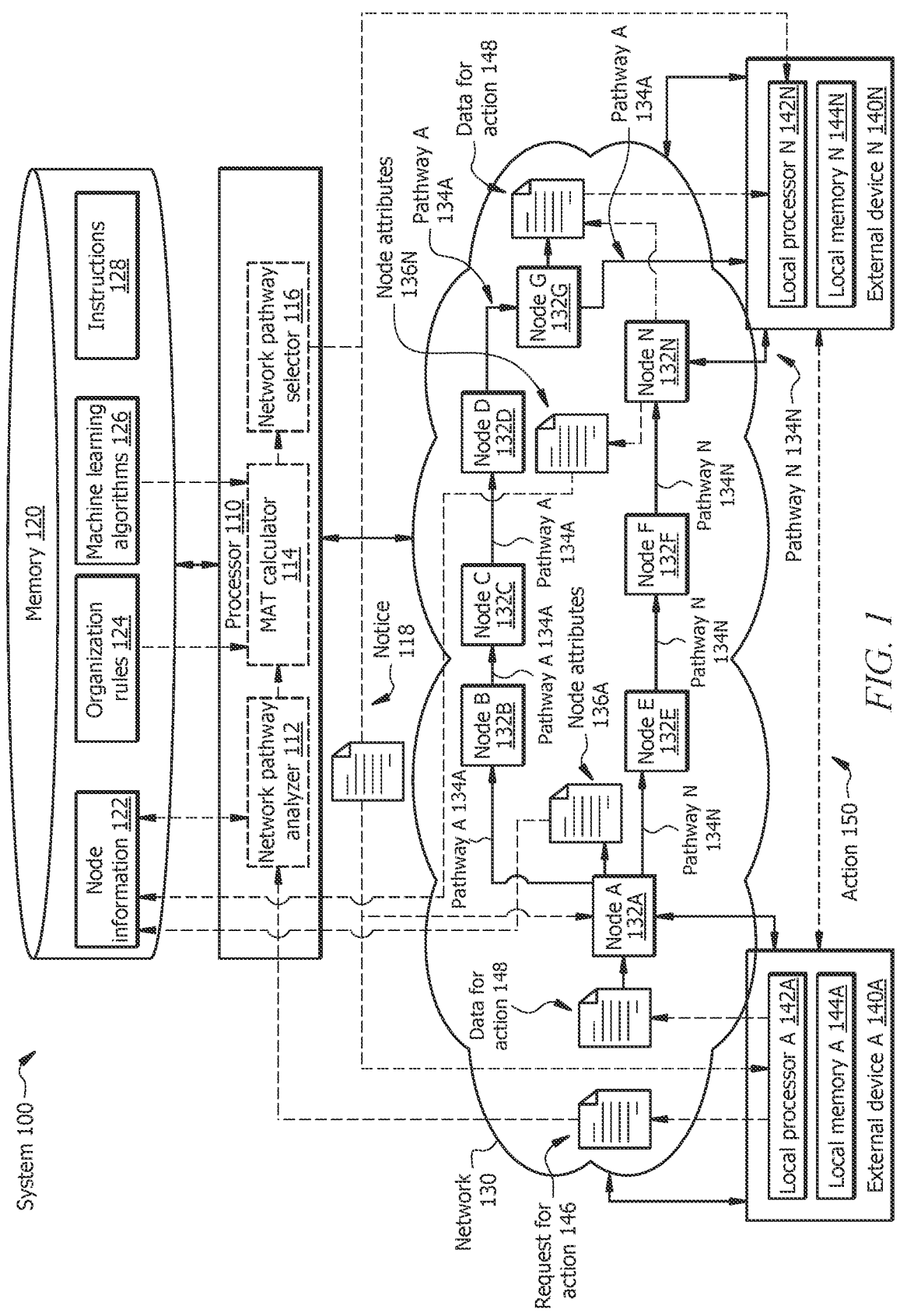
FIG. 1 illustrates one embodiment of a system configured to determine network pathway security vulnerabilities.

System Configured to Determine Network Pathway Security. Overview FIG. 1 is a schematic diagram of a system 100 configured to perform real-time monitoring of network pathways, e.g., 134A, and determine which network pathway, e.g., 134A, provides an acceptable amount of security and has the best performance. More specifically, system 100 is configured to determine which network pathway 134A-134N to conduct an action 150 between a first external device 140A and a second external device 140N. Processor 110 receives a request for action 146 from the initiating or first external device 140A. The processor 110 then performs a network pathway selector operation 116, based on the results of a network pathway analyzer operation 112 and MAT calculator operation 114, which utilizes node information 122 received from each node 132A-132N of the network 130. The processor 110, when performing the network pathway selector operation, determines a preferred network pathway, e.g., 134A, to perform action 150 between an initiating or first external device 140A and the second external device 140N, and data for performing the action 148 is transmitted, through the preferred network pathway, e.g., 134A.

In one embodiment, system 100 comprises a processor 110 and a memory 120 in signal communication with an initiating external device 140A and a receiving or second external device 140N connected through a network 130. The network may include a plurality of nodes 132A-132N distributed over various geographical locations. The system 100 may be configured as shown or in any other suitable configuration.

External Devices

The external devices 140A-140N may be any number of devices that perform actions 150 and communicate over a network 130. Examples of the external devices 140A-140N include, but are not limited to, computers, laptops, mobile devices (e.g., smartphones or tablets), servers, clients, automated teller machines (ATM), point of sale devices (POS), or any other suitable type of devices that may be used to initiate and complete an action 150. The external devices 140A-140N each include at least one local processor 142A-142N that performs one or more processes or operations, including but not limited to sending to the processor 110 through the network 130 a request for action 146 sending data for the action 148 through the network in order to perform an action 150 with another external device, e.g., 140N.

The external devices 140A-140N may include at least one local memory 144A-144N for storing instructions for producing a request for action 146 and performing action 150. The local memory 144A-144N may store other data and instructions related to the operations of the external device 140A-140N and is not limited to the above-described instructions and data.

While FIG. 1 shows the external devices 140A-140N each including a single local processor 142A-142N and a single local memory 144A-144N, they may include any suitable number and combination of local processors 142A-142N and local memories 144A-144N as well as any other necessary components; with only one local processor, e.g., 144A and one local memory, e.g., 144A being shown in FIG. 1 for simplicity.

The external devices 140A-140N are configured to perform one or more actions 150 between at least two external devices, e.g., 140A and, e.g., 140N. The one or more actions 150 may be any interaction between at least two external devices, e.g., 140A and, e.g., 140N. Actions 150 may include but are not limited to, actions exchanging data for action 148, such as web pages, database data, data related to one or more applications, real-time exchanges of data for entertainment, video, augmented reality, financial exchanges, and/or any other action that utilizes a network 130 to facilitate that transfer of data for the action 148 when the action 150 is being performed.

When an action 150 is initiated between the first external device, e.g., 140A, and the second external device, e.g., 140N, at least a request for action 146 is sent through the network 130 to the processor 110. Once the local processor 142A sends the request for action 146 to processor 110, the local processor 142A begins sending data for the action 148 to the first node 132A of network 130 that the external device 140A is connected with. As will be described below, the data for the action 148 is transmitted through network 130 using a selected first network pathway, e.g., 134A, and the second external device, e.g., 140N, receives the data for action 148 from network 130.

Network

The network 130 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 130 may be configured to support any suitable type of communication protocol as would be appreciated by one of ordinary skill in the art.

In one embodiment, the network 130 may include a plurality of nodes 132A-132N. Each node, e.g., 132A, may be a router, gateway, or another network device or computational device that receives data from another node, e.g., 132B, from one or more external devices 140A-140N or the processor 110. The nodes may be connected to any number of external devices 140A-140N and/or other nodes 132A-132N. The number of external devices 140A-140N and nodes 132A-132N is exemplary, and the disclosure is not limited to the number or configuration shown in FIG. 1.

In one embodiment, the nodes 132A-132N may be located in various geographical locations. Each node, e.g., 132A, may be located at a different location, region, and/or continent than a second node, e.g., 132N. A plurality of nodes 132A, 132B, 132C, 132D, and 132G may form a first pathway, e.g., 134A, and a second plurality of nodes 132A, 132E, 132F, and 132N may form a second pathway, e.g., 1344N. The number of pathways 134A-134N is not limited to the two shown in FIG. 1, with only two being shown for simplicity. Since the nodes 132A-132N may be in a plurality of geographical locations, each pathway, e.g., 134A, may include one or more geographical locations and/or regions not included in a second pathway, e.g., 134N.

Each node, e.g., 132A, periodically or continuously produces node attributes 136A-136N, which are sent to the processor 110. The processor 110 stores the node information 122 in the memory 120 and uses that node information 122 when performing the network pathway analyzer operation 112, as will be described below, to select a network pathway, e.g., 134A, for use in sending data for the action 148 between the external devices 140A-140N. The node attributes 136A-136N may include such information as node telemetry, response time, peak hours, failure rate, capacity, current use, latency, speed, geographical location, current software version and types, hardware types and versions, node security status, and any other data that is useful for the processor 110 to determine which pathway 134A-134N is preferred or best for use in transferring data for an action 148.

As will be described below in more detail, processor 110 analyzes current node attributes, e.g., 136A, as well as historical node information 122 to assign a real-time multi-attribute threshold (MAT) score, chromatic indicator, and/or other indicator or score to each node 132A-132N. The MAT score and/or chromatic indicator are then aggregated and used by the processor 110 performing the network pathway selector operation 116 to select the best network pathway, e.g., 134A, to use to transfer data for the action 148 between the external device 140A and at least a second external device 140N. This selection is then communicated from the processor 110 to the initial node, e.g., 132A, connected to the initiating or first external device, e.g., 140A.

Memory

Memory 120 may be any type of storage for storing a computer program comprising instructions 128, node information 122, organization rules 124, and machine learning algorithms 126. The memory 120 may be a non-transitory computer-readable medium in operative communication with the processor 110. The memory 120 may be one or more disks, tape drives, or solid-state drives. Alternatively, or in addition, the memory 120 may be one or more cloud storage devices. The memory 120 may also be used as an over-flow data storage device to store applications when such applications are selected for execution and to store instructions 128 and data that are read during the execution of the applications. The memory 120 may be volatile or non-volatile. It may comprise read-only memory (ROM), random-access memory (RAM), ternary content-addressable memory (TCAM), dynamic random-access memory (DRAM), and static random-access memory (SRAM).

The memory 120 stores instructions 128 that, when executed by the processor 110, causes the processor 110 to perform the operations described in FIGS. 1 and 2 below. Instructions 128 may comprise any suitable set of instructions, logic, rules, or code. The memory 120 may include storage that takes the form of a database for storing such things as node information 122 and organization rules 124. These may be stored and recalled using known protocols such as SQL, XML, and/or any other protocol or language that a user, administrator, or developer of the system 100 wishes to use. The node information 122 and organization rules 124 may be stored in other forms, and the disclosure is not limited to storing node information 122, and organization rules 124 as a database.

The memory 120 in one or more embodiments stores machine learning algorithms 126. The machine learning algorithms 126 may include any useful machine learning algorithms 126, such as, but not limited to, neural networks such as a convolutional neural network (CNN) and a long short-term memory (LSTM) neural network. In at least one embodiment, the machine learning algorithm 126 includes a CNN used by the processor 110 in calculating the MAT score, as will be described in more detail below. The disclosure is not limited to the processor 110 using a CNN to perform the MAT calculator operation 114. The memory 120 may store additional or other machine learning algorithms 126 for use in performing the network pathway analyzer operation 112, MAT calculator operation 114, network pathway selector operation 116, and/or any other operation performed by the processor 110.

Processor

Processor 110 receives requests for action 146, and node attributes 136A-136N from the external device 140A-140N and nodes 132A-132N, using network 130. The processor 110 then uses the node attributes 136A-136N to select a network pathway 134A-134N for a first external device, e.g., 140A, to perform an action with a second external device, e.g., 140N. The processor 110 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 110 may be a programmable logic device, a microcontroller, a microprocessor, or any suitable combination of the preceding. The processor 110 is communicatively coupled to and in signal communication with the memory 120. The one or more processors making up the processor 110 are configured to process data and may be implemented in hardware or software. For example, the processor 110 may be 8-bit, 16-bit, 32-bit, 64-bit, or of any other suitable architecture. The processor 110 may include an arithmetic logic unit (ALU) for performing arithmetic and logic operations, processor registers that supply operands to the ALU and store the results of ALU operations, and a control unit that fetches instructions 128 from memory 120 and executes them by directing the coordinated operations of the ALU, registers and other components.

The processor 110 is in operative communication with the memory 120. The processor 110 is configured to implement various instructions 128 stored in memory 120. The processor 110 may be a special-purpose computer designed to implement the instructions 128 and/or functions disclosed herein. For example, the processor 110 may be configured to perform operations, including the operations of the methods described in FIG. 2.

The processor 110 uses the node information 122, organization rules 124, and machine learning algorithms 126 to perform various operations such as, but not limited to, a network pathway analyzer operation 112, a MAT calculator operation 114, and/or a network pathway selector operation 116. The processor 110 may perform more or less operations than shown in FIG. 1 and described in FIG. 2; the specific operations shown are only examples. While a single processor 110 is shown, the processor 110 may include a plurality of processors or computational devices. The operations, e.g., network pathway analyzer operation 112, MAT calculator operation 114, and network pathway selector operation 116, described herein as being performed by the processor 110 may be performed by a separate processor or software application executed on a single computational device e.g., processor 110, or they may be located on separate servers and/or even separate datacenters such as a cloud server, the external devices 140A-140N, and/or one or more nodes 132A-132N.

In one or more embodiments, processor 110 receives from the network 130 node attributes 136A-136N. As described above, these attributes 136A-136N contain telemetry for the device making up the node 136A-136N as well as any other information needed for determining a MAT score and/or chromatic indicator for one or more nodes, e.g., 132A and/or pathways 134A-134N. These node attributes 136A-136N are then stored in memory 120 as node information 122; the node information 122 may include storage of the attributes 136A-136N for multiple time periods and may be stored with time stamps or other indicia of when the node attributes 136A-136N were compiled and/or produced by the individual nodes 132A-132N. Other data may also be stored in the node information 122 collected by the processor 110 from the network 130, such as information on previous cyberattacks or other failures of individual nodes, e.g., 132A, or pathways, e.g., 134A.

When sometime later, an external device, e.g., 140A, sends a request for action 146 through the network 130 to processor 110, processor 110 receives the request for action 146 and begins determining a network pathway for the external device, e.g., 140A, to use for sending the data for the action 148 to a second external device, e.g., 140N, in order to perform one or more actions 150. The processor 110 then retrieves node information 122 from memory 120 and performs a network pathway analyzer operation 112 using retrieved node information 122.

The processor 110, when performing the network pathway analyzer operation 112, analyzes the request for action 146 sent from the first external device, e.g., 140A, and determines various pathways 134A-134N in the network 130 that can facilitate the action 150 and then retrieves node attributes 136A-136N for the individual nodes, e.g., 132A, from the node information 122 in the memory 120. When two external devices 140A-140N are at diverse geographic positions or with larger, more complicated networks, there may be many pathways that the data for the action 148 may travel over. Further, not all of the networks may be under a particular organization's control; for example, if network 130 is the Internet, one or more nodes, e.g., 132A, may be controlled by a separate Internet service provider (ISP) and may be more or less secure than other nodes, e.g., 132N, that may be controlled by the organization that provides system 100.

The network pathway analyzer operation 112 may analyze all possible pathways 134A-134N. Alternatively, the network pathway analyzer operation 112 may use predetermined criteria such as pathlength and/or organizational rules 124 retrieved from the memory 120 by the processor 110, to select a predetermined number of pathways 134A-134N to pass to the MAT calculator operation 114 and/or network pathway selector operation 116.

Once the plurality of pathways is determined by the network analyzer operation 112, and node information 122 for those pathways 134A-134N is retrieved from memory 120, in one or more embodiments, the processor 110 then performs a multi-attribute threshold (MAT) calculator operation 114. The MAT calculator operation 114 is performed for each node, e.g., 132A, of a particular pathway, e.g., 134A; for example, as shown in FIG. 1, pathway 134A would have a MAT calculator operation 114 performed for each of nodes 132A-132D and 132G. The MAT calculator operation 114 applies a weighted score based on predetermined criteria to each attribute of a given node's attributes, e.g., 136A, and averages those scores using the weight score to find a final score for each node, e.g., 132A. In one or more embodiments, the final score may indicate a probability that the node may reliably transmit the data and/or the probability that the node is compromised.

The MAT calculator operation 114 analyzes such attributes as node telemetry, response time, peak hours, failure rate, capacity, current use, latency, speed, geographical location, current software version and types, hardware types and versions, node security status, previous indications of fraud, and any other data that is useful for the processor 110 to determine which pathway 134A-134N is preferred or best for use in transferring data for an action 148. Each of these attributes is given a predetermined weight, which may be determined based on organization rules 124 where, for example, in a non-limiting example, latency may be given a higher weight than the current software version and type for time-critical actions 150. In contrast, node security status and current software versions might be given a higher weight for actions 150 with financial consequences. Other combinations of weights may be applied based on organization rules 124, and the disclosure is not limited by the exemplary weights and/or attributes.

Alternatively, or in addition, the weights and/or the MAT calculation itself may be performed using one or more machine learning algorithms, 126, retrieved from the memory 120 by the processor 110. In at least one embodiment, the MAT calculator operation 114 is performed using a convolutional neural network (CNN) and/or a long short-term memory (LSTM) neural network to interpret the attributes 136A-136N and apply scores to each specific attribute making up a node's attributes, e.g., 136A, and/or determined the predetermined weights to apply to the various scores. The CNN and/or LSTM neural networks may be updated based on feedback from each of the nodes 132A-132N and/or the results of each action and the specific predetermine weight applied to a given node, e.g., 132A may change depending on the success and attributes of the node 132A as well as the pathway 134A that is chosen for transferring the data for the action 148 between the at least two external devices 140A-140N.

Once the processor 110, performing the MAT calculator operation 114 determines a MAT score for each node, e.g., 132A, in a particular pathway, e.g., 134A, the processor 110 then calculates an aggregated network pathway score for each pathway 134A-134N identified by the network pathway analyzer operation 112. This may be performed by adding all of the MAT scores for the individual nodes, e.g., 132A-132D, and 132G, in the first pathway 134A and dividing by the total number of nodes, e.g., 132A-132D and 132G, in a particular pathway, e.g., 134A, to obtain a simple mean.

Additionally, or alternatively, a machine learning algorithm 126 such as the CNN may be used to analyze a given pathway, e.g., 134A, and assign an aggregated score based on not only the individual scores of each individual node, e.g., 132A-132D and 132G, in a particular pathway, e.g., 134A, but based on other criteria that the machine learning algorithm 126 has learned is essential for determining which pathway, e.g., 134A, should be selected for use by the network pathway selector operation 116. Other methods of determining an aggregate network pathway score may be used without departing from the disclosure.

In one or more embodiments, the processor, when performing MAT calculator operation 114, may also determine a real-time chromatic indicator. The processor 110, when providing a real-time chromatic indicator to each node, assigns to each node 132A-132N a color such as red, yellow, or green. Other colors or indicia may be assigned without departing from the disclosure, and red, yellow, and green are chosen simply due to their common usage in such indications. The chromatic indicators may then be provided to an administrator, user, or other concerned party so that they may take corrective action on a given node, e.g., 132A.

For example, in a non-limiting example, suppose node C 132C is found to have a low MAT score. In that case, it may be given a yellow chromatic indicator, indicating it may be used, but with caution. At the same time, if node F 132F has been found to be currently or recently compromised, it might be given a red chromatic indicator, indicating it should not be used until an administrator or other party has the opportunity to perform corrective actions on that node. Similarly to the MAT score, each pathway 134A-134N may also be given a chromatic indicator, which may be used to indicate which pathways 134A-134N may need corrective actions or even suggest to an administrator, security personnel, or other concerned entity that a particular geographical region is being targeted for attacks and/or is unsecured and that processor 110 when performing the network pathway selector operation 116 should choose a pathway, e.g., 134A that does not pass through that particular geographical region.

Once processor 110 finishes performing the MAT calculator operation 114 and/or determining a chromatic indicator, processor 110 then performs a network pathway selector operation 116. The processor 110, when performing the network pathway selector operation 116, selects from the network pathways 134A-134N identified in the network pathway analyzer operation 112 operation, a first network pathway, e.g., 134A, that has the highest aggregate network pathway score. If the highest aggregate network pathway score is less than a predetermined threshold, then the processor 110 performing the network pathway selector operation 116 may require multi-factor authentication for performing the action 150.

Once processor 110, performing the network pathway selector operation 116, selects a particular pathway, e.g., 134A, the processor 110 then sends a notice 118 to at least the first node, e.g., 132A of the particular pathway, e.g., 134A, to indicate which nodes 132A-132N and/or pathway, e.g., 134A the data for the action 148 should be sent through to the second external device, e.g., 140N. Notice 118 may also be sent to the first and second external devices 140A-140N. When multi-factor authentication is needed, an indication that multi-factor authentication should be performed may also be included in notice 118.

Identifying a Network Pathway Process

FIG. 2 is a flowchart of an embodiment of method 200 for identifying by the processor 110 a network pathway, e.g., 134A, to be used for performing an action 150. The processor 110 may execute instructions 128 stored in the memory 120, which employ method 200 for identifying a network pathway, e.g., 134A, to use for performing an action 150 between a first external device, e.g., 140A, and a second external device, e.g., 140N.

The method 200 begins at operation 205, where the processor 110 periodically receives node information 122 for each node 132A-132N. Each node 132A-132N is part of at least one or more of a plurality of pathways 134A-134N. The node information comprises node attributes 136A-136N, which may include telemetry and other useful information from each node as well as the hardware, software, and/or other components and characteristics of the node, e.g., 132A. As described above, attributes 136A-136N may comprise such things as response time, peak hours, failure rate, capacity, current use, latency, speed, geographical location, current software version and types, hardware types and versions, node security status, and any other data that the processor 110 needs to analyze the nodes 132A-132N, perform at least a mat calculator operation 114, and select a pathway, e.g., 134A for communicating data for the action 148 between at least two external devices 140A-140N when performing action 150.

The node attributes 136A-136N are received periodically or continuously from each node 132A-132N, making up network 130. In one or more embodiments, the node attributes 136A-136N may be received at predetermined intervals such as, but not limited to, every second, minute, hour, or day. The predetermined interval may be specific to an individual node, e.g., 132A, or may be assigned by network 130 or processor 110 based on network 130 compacity, memory 120 capacity, and/or other criteria.

Once the node attributes 136A-136N are received from each node 132A-132N, they are stored in operation 210 in memory 120 as node information 122. In one or more embodiments, node information 122 is stored as a database in memory 120, and node information 122 may optionally be periodically purged so that only pertinent data is present. The node information 122 may be stored with a time stamp, allowing the processor 110 to perform a historical analysis of the performance or attributes of a particular node, e.g., 132A, or pathway, e.g., 134A, over time. Processor 110 continues to perform operations 205 and 210 periodically or continuously as node attributes 136A-136N are received.

Once the node information 122 is stored in memory 120 by processor 110 in operation 210, method 200 proceeds to operation 215. In operation 215, processor 110 receives a request for action 146 from the first external device, 140A. The request for action 146 comprises a request to perform a first action 150 using one of the plurality of network pathways 134A-134N of the network 130. Once processor 110 receives the request in operation 215, method 200 proceeds to operation 220.

In operation 220, processor 110 performs a multi-attribute threshold (MAT) calculator operation 114 to calculate a MAT score for each node 132A-132N in a particular or next network pathway, e.g., 134A. The processor 110 calculates the MAT score by analyzing the node information 122 received from each node, e.g., 132A. Specifically, processor 110 uses such attributes as node telemetry, response time, peak hours, failure rate, capacity, current use, latency, speed, geographical location, current software version and types, hardware types and versions, node security status, previous indications of fraud, and any other data that is useful for the processor 110 to determine which pathway, e.g., 134A is preferred or best for use in transferring data for an action 148. Each attribute is given a predetermined weight, which may be determined based on organization rules 124. For example, in a non-limiting example, for an action 150 that requires a large amount of capacity, capacity or availability may be given a higher weight by processor 110. Other combinations of weights may be applied based on organization rules 124, and the disclosure is not limited by the exemplary weights and/or attributes.

Alternatively, or in addition, the weights and/or the MAT calculation itself may be performed using one or more machine learning algorithms, 126, retrieved from the memory 120 by the processor 110. In at least one embodiment, operation 220 is performed by the processor 110 using a convolutional neural network (CNN) and/or a long short-term memory (LSTM) neural network to interpret the attributes 136A-136N and apply scores to each specific attribute making up a node's attributes, e.g., 136A, and/or determined the predetermined weights to apply to the various scores. The CNN and/or LSTM neural networks may be performed by the processor 110 or an external device, e.g., 140A. Other or additional machine learning algorithms 126 and non-machine learning algorithms may be used by the processor in operation 220 than those described, and method 200 is not limited to using CNN and/or LSTM neural networks.

Once processor 110, performing operation 220, determines a MAT score for each node, e.g., 132A, in a particular pathway, e.g., 134A, method 200 continues to operation 225. In operation 225, the processor 110 calculates an aggregated network pathway score using the MAT score calculated in operation 220 for each node associated with a particular network pathway, e.g., 134A. The MAT score for each node, e.g., 312A, in the pathway, e.g., 134A, is taken, and an aggregated network pathway score is determined. This may be performed, for example, by adding all of the MAT scores for the individual nodes, e.g., 132A-132D and 132G, in the particular pathway 134A and dividing by the total number of nodes, e.g., 132A-132D and 132G, in a particular pathway, e.g., 134A, to obtain a simple mean.

Additionally, or alternatively, a machine learning algorithm 126 such as the CNN may also be used to analyze a pathway, e.g., 134A, and assign an aggregated score based on not only the individual scores of each individual node, e.g., 132A-132D and 132G, in the particular pathway, e.g., 134A, but also based on other criteria that the machine learning algorithm 126 has learned is useful.

Once the aggregated network pathway score is calculated in operation 225, method 200 proceeds to operation 230, where a determination is made by processor 110 if the aggregated network pathway score has been calculated for all the network pathways. If the answer is yes, method 200 proceeds to operation 235; however if the answer is no, method 200 returns to operation 220, and the processor repeats operations 220 and 225 for each network pathway 134A-134N.

If the processor determines in operation 230 that the aggregated network pathway score has been calculated for all network pathways 134A-134N, the method proceeds to operation 235. In operation 235, processor 110 identifies network pathways 134A-134N with the highest aggregated network pathway score. The processor 110 may then compare the aggregated network pathway score for each of the identified network pathways 134A-134N and then determine or identify the aggregated network pathway, e.g., 134A, with the highest pathway score.

The identified network pathway, e.g., 134A with the highest score, is then analyzed in operation 240 by the processor to determine if its aggregate network pathway score is higher than a threshold. This threshold is chosen based on organization rules 124 or by a user or operator to identify when a particular network pathway, e.g., 134A, requires multi-factor authentication or other security means to be used to carry out an action 150 properly or safely between at least two external devices 140A-140N.

If in operation 240, the processor determines that the identified network pathway, e.g., 134A, has an aggregated pathway score less than the threshold, the method proceeds to operation 245, and the processor causes multi-factor authentication to be performed in operation 245. Multi-factor authentication may take the form of two-factor authentication or other means of authenticating either the user of one or more of the external devices 140A-140N or authenticating an action 150 itself. In one or more alternative embodiments, other security measures may be taken besides multi-factor authentication, and the disclosure is not limited to performing multi-factor authentication in operation 245.

Once operation 245 is completed or if the aggregated network pathway score is higher than the threshold in operation 240, the method proceeds to operation 250. In operation 250, the processor notifies the network 130 and/or external devices 140A-140N which network pathway 134A-134N has been identified as the identified or selected network pathway, e.g., 134A, for performing the first action, e.g., 150. The external devices 140A-140N may then perform the first action, e.g., 150, using the identified pathway, e.g., 134A, to forward data for the action 148 from the first external device 140A to the second external device 140N.

In one or more embodiments, once operation 250 is completed, the processor 110 receives information, including feedback from each of the nodes 132A-132N and/or the external devices 140A-140N about the forwarding of the data for the action 148 over the identified pathway, e.g., 134A. This information, which is used to update the node information 122 stored in the memory, includes such information as latency, failure, if the data for the action 148 was intercepted and/or manipulated in any manner, and/or any other information useful for selecting a network pathway, e.g., 134A for performing a second action, e.g., 150 at a later time. The updated node information 122 may be stored by the processor 110 in node information 122 and/or used to update one or more of the machine learning algorithms 126 used for performing the MAT calculator operation 114 and/or network pathway selector operations 116. Once operation 255 is completed, the method 200 of FIG. 2 ends.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system for real-time monitoring of network pathways, the system comprising:
    a memory configured to store network node information; and
    a processor operably coupled to the memory and configured to:
        receive information periodically from each node of a plurality of network pathways, wherein the information comprises a plurality of attributes of each node, the plurality of attributes includes at least response time, geographic location, failure rate, and latency;
        store the received information in the memory;
        receive a request from an external device to perform a first action using one of the plurality of network pathways;
        calculate a score for each node of the plurality of network pathways using the received information stored in the memory, wherein during the calculation, each of the plurality of attributes is given a different weight based at least in part upon predetermined criteria, and wherein the calculated score for each node indicates each node's reliability;
        calculate for each of the plurality of network pathways an aggregated network pathway score, wherein the aggregated network pathway score is calculated based at least in part upon the score of each node associated with each of the plurality of network pathways, wherein the aggregated network pathway score indicates a particular pathway's reliability;

identify a first network pathway from among the plurality of network pathways based on at least in part upon the aggregated network pathway score for each of the plurality of network pathways; and perform the first action using the identified first network pathway;

wherein identifying the first network pathway for performing the first action comprises:

comparing the aggregated network pathway score for each of the plurality of network pathways;

determining a network pathway that has a highest aggregated network pathway score as the first network pathway;

comparing the highest aggregated network pathway score to a predetermined threshold; and performing multi-factor authentication when the highest aggregated network pathway score is less than the predetermined threshold.

2. The system of claim 1, wherein the calculating the score for each node is performed using a neural network.

3. The system of claim 2, wherein the neural network is a convolutional neural network.

4. The system of claim 2, wherein the processor is further configured to:

receive, after performing the first action, feedback from each node of the first network pathway; and use the feedback from each node to update the neural network.

5. The system of claim 1, wherein the predetermined criteria are determined by an organization associated with the first action.

6. The system of claim 1, wherein the plurality of attributes of each node further comprise software version of each node and security status of each node.

7. The system of claim 1, wherein the plurality of attributes of each node further comprise previous indications of fraud associated with each node.

8. A method for real-time monitoring of network pathways, comprising:

receiving information periodically from each node of a plurality of network pathways, wherein the information comprises a plurality of attributes of each node, the plurality of attributes includes at least response time, geographic location, failure rate, and latency;

storing the received information in a memory;

receiving a request from an external device to perform a first action using one of the plurality of network pathways;

calculating a score for each node of the plurality of network pathways using the received information stored in the memory, wherein during the calculation, each of the plurality of attributes is given a different weight based at least in part upon predetermined criteria, and wherein the calculated score for each node indicates each node's reliability;

calculating for each of the plurality of network pathways an aggregated network pathway score, wherein the aggregated network pathway score is calculated based at least in part upon the score of each node associated with each of the plurality of network pathways, wherein the aggregated network pathway score indicates a particular pathway's reliability;

identifying a first network pathway from among the plurality of network pathways based on at least in part upon the aggregated network pathway score for each of the plurality of network pathways; and performing the first action using the identified first network pathway;

wherein identifying the first network pathway to perform the first action includes:

comparing the aggregated network pathway score for each of the plurality of network pathways;

determining a network pathway that has a highest aggregated network pathway score as the first network pathway;

comparing the highest aggregated network pathway score to a predetermined threshold; and performing multi-factor authentication when the highest aggregated network pathway score is less than the predetermined threshold.

9. The method of claim 8, wherein the calculating the score for each node is performed using a neural network.

10. The method of claim 9, wherein the neural network is a convolutional neural network.

11. The method of claim 10, further comprising:

receiving, after performing the first action, feedback from each node of the first network pathway; and using the feedback from each node to update the neural network.

12. The method of claim 9, wherein the plurality of attributes of each node further comprises a software version of the node and a security status of each node.

13. A non-transitory computer-readable medium storing instructions that when executed by a processor cause the processor to:

receive information periodically from each node of a plurality of network pathways, wherein the information comprises a plurality of attributes of each node, the plurality of attributes includes at least response time, geographic location, failure rate, and latency;

store the received information in a memory;

receive a request from an external device to perform a first action using one of the plurality of network pathways;

calculate a score for each node of the plurality of network pathways using the received information stored in the memory, wherein during the calculation, each of the plurality of attributes is given a different weight based at least in part upon predetermined criteria, and wherein the calculated score for each node indicates each node's reliability;

calculate for each of the plurality of network pathways an aggregated network pathway score, wherein the aggregated network pathway score is calculated based at least in part upon the score of each node associated with each of the plurality of network pathways, wherein the aggregated network pathway score indicates a particular pathway's reliability;

identify a first network pathway from among the plurality of network pathways based on at least in part upon the aggregated network pathway score for each of the plurality of network pathways; and perform the first action using the identified first network pathway;

wherein identifying the first network pathway for performing the first action comprises:

comparing the aggregated network pathway score for each of the plurality of network pathways;

determining a network pathway that has a highest aggregated network pathway score as the first network pathway;

comparing the highest aggregated network pathway
score to a predetermined threshold; and
performing multi-factor authentication when the high-
est aggregated network pathway score is less than the
predetermined threshold.

14. The non-transitory computer-readable medium of
claim 13, wherein the processor calculates the score for each
node using a neural network.

15. The non-transitory computer-readable medium of
claim 14, wherein the neural network is a convolutional
neural network.

16. The non-transitory computer-readable medium of
claim 15, wherein the instructions further cause the proces-
sor to:

receive, after performing the first action, feedback from
each node of the first network pathway; and
use the feedback from each node to update the neural
network.

17. The non-transitory computer-readable medium of
claim 13, wherein the plurality of attributes of each node
further comprise previous indications of fraud associated
with each node.

\* \* \* \* \*